United States Patent [19]

Funada et al.

[11] 4,183,630
[45] Jan. 15, 1980

[54] TWISTED NEMATIC FIELD EFFECT MODE LIQUID CRYSTAL DISPLAY

[75] Inventors: Fumiaki Funada; Kiyoshi Toda, both of Yamatokoriyama; Masataka Matsuura, Tenri; Tomio Wada, Nara, all of Japan

[73] Assignee: Sharp Kabushiki Kaisha

[21] Appl. No.: 955,335

[22] Filed: Oct. 27, 1978

[30] Foreign Application Priority Data

Oct. 31, 1977 [JP] Japan .................... 52-131368

[51] Int. Cl.² .................................. G02F 1/13
[52] U.S. Cl. .......................... 350/334; 350/96.27
[58] Field of Search ..................... 350/334, 96.27

[56] References Cited

U.S. PATENT DOCUMENTS

| | | | |
|---|---|---|---|
| 3,891,309 | 6/1975 | Bonne | 350/334 X |
| 3,976,361 | 8/1976 | Fraas et al. | 350/334 X |
| 4,005,929 | 2/1977 | Adams et al. | 350/334 X |
| 4,017,157 | 4/1977 | van Riet | 350/334 X |

Primary Examiner—Edward S. Bauer
Attorney, Agent, or Firm—Birch, Stewart, Kolasch & Birch

[57] ABSTRACT

A twisted nematic field effect mode liquid crystal display cell comprises a liquid crystal layer sandwiched between front and rear substrates on which transparent electrodes are formed, a front polarizer disposed in front of the front substrate, and a rear polarizer disposed at the back of the rear substrate. The rear substrate comprises a glass plate, and the front substrate comprises a fiber plate. The fiber plate comprises a plurality of optical fibers of which axes are perpendicular to the plane determined by the liquid crystal layer.

3 Claims, 5 Drawing Figures

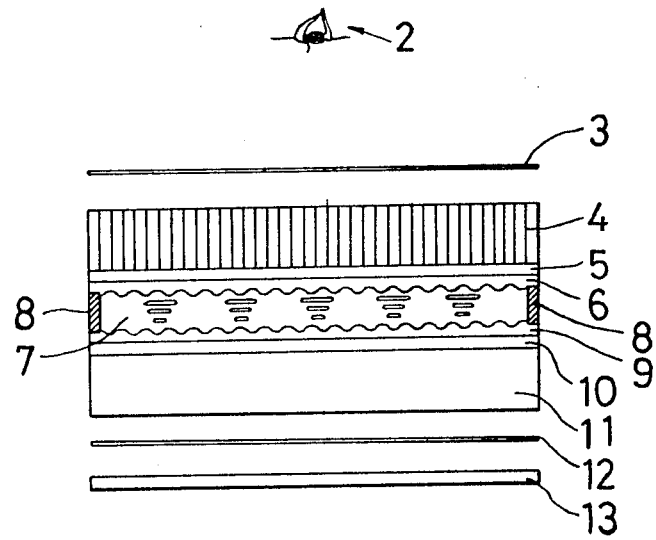
FIG.3
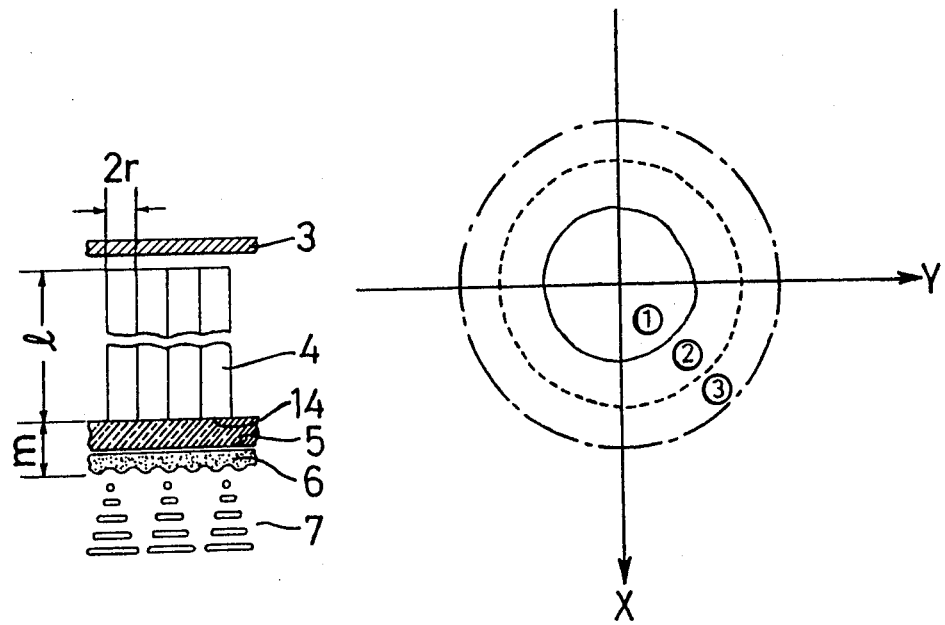
FIG.4
FIG.5

TWISTED NEMATIC FIELD EFFECT MODE LIQUID CRYSTAL DISPLAY

BACKGROUND AND SUMMARY OF THE INVENTION

The present invention relates to a twisted nematic field effect mode liquid crystal display and, more particularly, to a cell structure which improves viewing angle characteristics.

Generally, the twisted nematic field effect mode liquid crystal display exhibits a peculiar viewing angle dependent property because of the twisted construction of liquid crystal molecules. The viewing angle range varies in a fashion depending on a driving voltage level applied to the liquid crystal display cell. A remarkable viewing angle dependency is observed when the display is driven by a signal of a low effective voltage.

Accordingly, an object of the present invention is to provide a twisted nematic field effect mode liquid crystal display cell, which enhances the display quality.

Another object of the present invention is to uniform the display contrast without regard to a viewing angle in a twisted nematic field effect mode liquid crystal display.

Other objects and further scope of applicability of the present invention will become apparent from the detailed description given hereinafter. It should be understood, however, that the detailed description and specific example, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a front substrate for sandwiching a liquid crystal layer comprises a fiber plate. The fiber plate is made of a plurality of optical fibers of which axes are perpendicular to the liquid crystal layer. The fiber plate has a surface confronting the liquid crystal layer and substantially parallel to the liquid crystal layer.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 3 is a sectional view of an embodiment of a twisted nematic field effect mode liquid crystal display cell of the present invention;

FIG. 4 is an enlarged sectional view of a portion of the twisted nematic field effect mode liquid crystal display cell of FIG. 3; and FIG. 5 is a schematic chart for explaining uniform viewing angle characteristics obtained by the twisted nematic field effect mode liquid crystal display cell of FIG. 3.

DESCRIPTION OF THE PREFERRED EMBODIMENTS

Figure 1:
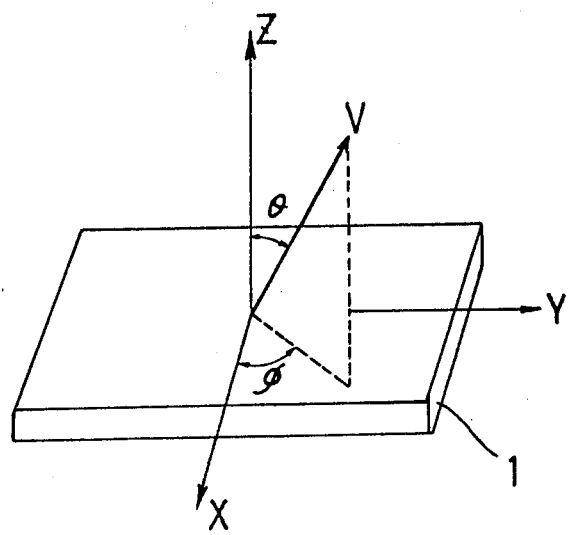
FIG. 1 is a perspective view for explaining a viewing angle.

Referring now in detail to the drawings, and to facilitate a more complete understanding of the present invention, observing direction factors $\theta$ and $\phi$ are first defined with reference to FIG. 1.

XY rectangular coordinates determine a display surface of a liquid crystal display device 1 in such a manner that the X axis parallels a major axis of liquid crystal molecules adjacent to one substrate in a condition where no electric field is applied to the device. A Z axis determines the normal direction of the display surface. An angle $\theta$ represents an angle formed between an observing direction vector V and the Z axis, and an angle $\phi$ represents an angle formed between the X axis and a projection of the observing vector V on the XY coordinates plane.

Figure 2:
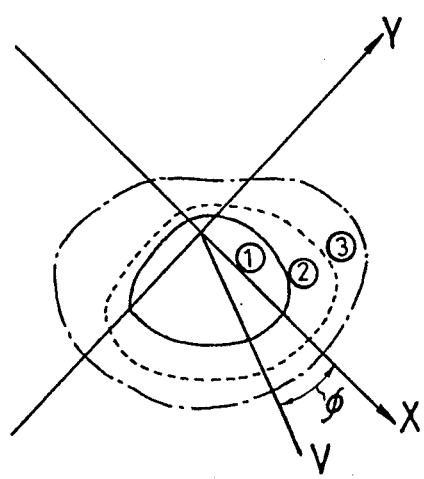
FIG. 2 is a schematic chart for explaining an observing direction dependency in a twisted nematic field effect mode liquid crystal display of the prior art.

FIG. 2 shows an observing direction dependency in a twisted nematic field effect mode liquid crystal display of the prior art.

FIG. 2 shows a display contrast ratio varying in dependent on the angle $\theta$, when the angle $\theta$ is constant ($\theta = 20°$), wherein a curve ① shows a condition where the effective value of the applied voltage is 2.5 volts, a curve ② shows a condition where the effective value is 3.0 volts, and a curve ③ shows a condition where the effective value is 6.0 volts. More specifically, the area surrounded by the curve exhibits a good display contrast, whereas the exterior of the curve does not exhibit the good contrast.

It will be clear from FIG. 2 that the viewing angle range is narrowed as the applied voltage becomes low. Moreover, the good contrast is obtained in a certain direction on the XY coordinates plate.

The detection of the property shown in FIG. 2 was conducted in the following condition.

The liquid crystal composition comprises the Schiff base mixture liquid crystal of MBBA, EBBA and BBAB, the liquid crystal layer has the 6 μm thickness, the titled angle of the liquid crystal molecules on the substrate is below 5° under the condition where no electric field is applied thereto, the electrode comprises the $In_2O_3$ transparent electrode, the orientation layer comprises the $SiO_2$ layer having grooves formed through the rubbing method, and the drive voltage comprises a rectangular alternating voltage signal of 32 Hz.

The $\phi$ dependency of the display contrast becomes large when the twisted nematic field effect mode liquid crystal display is driven in the multiplex fashion, or, the dynamic fashion. This is because the effective voltage level is reduced as the multiplex ratio increases. When, for example, the display is driven in the 1:3 bias voltage method, the effective voltage levels of the selected point and the non-selected point are $(8/N+1)^{\frac{1}{2}} \cdot V_o$ and $V_o$, respectively. Where, the selected point receives a voltage $3V_o$ for a period of time T/N, and the non-selected point receives a voltage $V_o$ for a period of time $(T-T/N)$, when the display repeat period is T and the multiplex ratio is N. It will be clear from the foregoing expression that the effective value of the selected point becomes low as the multiplex ratio N increases. The above-mentioned reduction of the effective value is not limited to the 1:3 bias method, but is generally observed in the 1:n bias method.

As discussed above, when the twisted nematic field effect mode liquid crystal display is driven in the multiplex fashion, the effective voltage applied to the selected point is reduced. Therefore, the viewing angle dependency of the display contrast is apparently observed. The display contrast is very bad when observed in the normal direction, or $\theta = 0$.

The present invention is to uniform the $\theta$ dependency of the display contrast in the twisted nematic field effect mode liquid crystal display.

FIG. 3 shows an embodiment of the liquid crystal display cell of the present invention.

An observer 2 is placed in front of the twisted nematic field effect mode liquid crystal display cell, which comprises a front polarizer 3, an optical fiber plate 4, a front transparent electrode 5, a front orientation layer 6, a liquid crystal layer 7, a seal member 8, a rear orientation layer 9, a rear transparent electrode 10, a rear glass substrate 11, a rear polarizer 12, and a reflector 13.

FIG. 4 shows, more specifically, the optical fiber plate 4. Like elements corresponding to those of FIG. 3 are indicated by like numerals.

The optical fiber plate 4 comprises a plurality of optical fibers of which axes are perpendicular to the layer plane of the liquid crystal layer 7, and has an internal surface 14 which is substantially parallel with the layer plane of the liquid crystal layer 7.

Each optical fiber has a length l, which is sufficiently longer than a radius r thereof, thereby uniforming the viewing angle dependency. The internal surface 14 of the fiber plate 4 is spaced from the liquid crystal layer 7 by a distance m, which corresponds to the thickness of the front transparent electrode 5 and the front orientation layer 6, which is preferably selected below 40r. If the distance m is greater than 40r, an image can not be observed through the fiber plate 4.

An insulator layer can be provided between the optical fiber plate 4 and the front transparent electrode 5 to form a flat surface. A glsss plate can be disposed between the front polarizer 3 and the fiber plate 4 to reinforce the fiber plate 4.

Although FIG. 3 shows the liquid crystal display cell of the reflection type, the present invention is applicable to the liquid crystal display cell of the transmission type.

FIG. 5 shows the contrast ratio viewing angle dependency of the twisted nematic field effect mode liquid crystal display cell of the present invention. The detection is carried out under the same condition as for the FIG. 2 detection, and the liquid crystal display cell is the construction shown in the following example.

It will be clear from FIG. 5 that the contrast ratio is symmetrical with respect to the Z axis. A good contrast is obtained in the normal direction ($\theta = 0$).

[EXAMPLE]

front and rear polarizers: HN 42 manufactured by Polaroid Corporation
liquid crystal composition: E-8 manufactured by BDH Chemicals Ltd., 10 $\mu$m thick
rear glass substrate: 3 mm thick
reflector: aluminum mat reflector
optical fiber plate: fiber plate PH97HS manufactured by Cannon Kabushiki kaisha, 5 mm thick
seal member: epoxy resin The invention being thus described, it will be obvious that the same may be varied in many ways. Such variations are not to be regarded as a departure from the spirit and scope of the invention, and all such modifications are intended to be included within the scope of the following claims.

What is claimed is:

1. A twisted nematic field effect mode liquid crystal display cell comprising a liquid crystal layer sandwiched between first and second substrates, and a polarizer positioned in front of said first substrate, said first substrate comprising;
   a fiber plate including a plurality of optical fibers of which axes are perpendicular to the plane of said liquid crystal layer.

2. The twisted nematic field effect mode liquid crystal display cell of claim 1, wherein said fiber plate has a surface confronting the liquid crystal layer, said surface being substantially parallel with said plane of said liquid crystal layer.

3. The twisted nematic field effect mode liquid crystal display cell of claim 2, wherein a transparent electrode is formed on said surface of said fiber plate.

* * * * *